UNITED STATES PATENT OFFICE 2,512,926

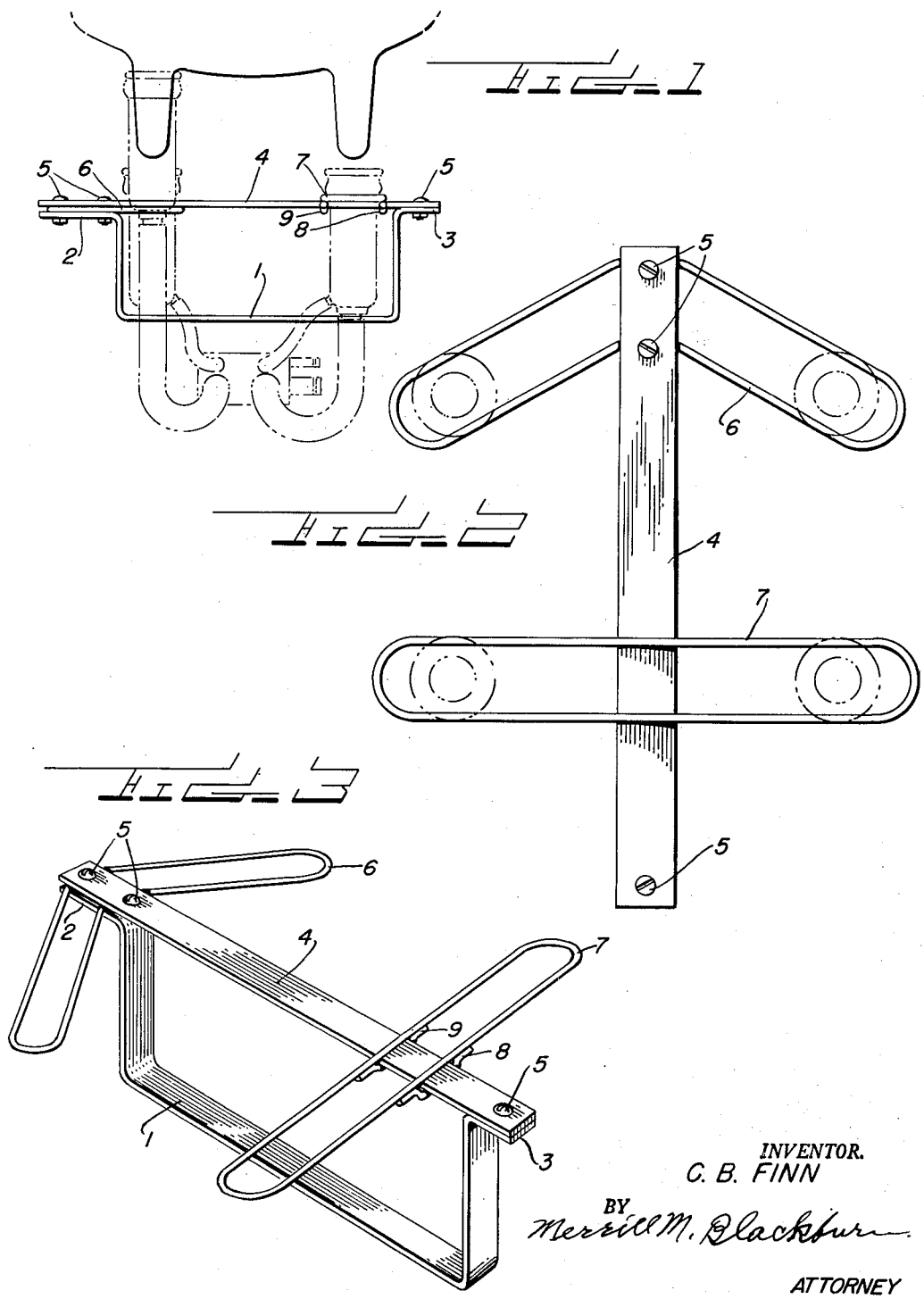

TEAT CUP HOLDER FOR MILKING MACHINES

Charles B. Finn, near Mount Pleasant, Iowa

Application October 29, 1948, Serial No. 57,196

3 Claims. (Cl. 31—58)

My present invention relates to positioning and supporting means for the teat cups of a milking machine and has among its objects the provision of a supporting frame which will support the teat cups while they are being applied so that one which has been applied will not drop off while another or others are being placed in operative position; the provision of a supporting frame which is so constructed that the teat cups can be adjusted laterally and forwardly and backwardly to fit different cows; and such further objects, advantages, and capabilities as will hereafter appear and as are inherent in the construction disclosed herein. My invention further resides in the combination, construction, and arrangement of parts illustrated in the accompanying drawings and, while I have shown therein what is now regarded as the preferred embodiment of this invention, I desire the same to be understood as illustrative only and not to be interpreted in a limiting sense.

In the drawings annexed hereto and forming a part hereof,

Fig. 1 shows in side elevation the frame of my invention and the relation of the teat cups thereto;

Fig. 2 shows this construction in plan view; and

Fig. 3 is a perspective view of this construction entirely detached from the teat cups.

Reference will now be made in greater detail to the annexed drawings for a more complete description of this invention. A wide U-shaped bar or bracket 1 has its ends 2 and 3 turned outwardly, as shown most clearly in Figs. 1 and 3, and a bar 4 connects the ends of this U-shaped frame to which it is connected by screws or bolts 5. A pair of wire loops 6 and 7 for the reception of the teat cups are provided, the loop 6 being bent in its mid-portion into the form of a wide obtuse angle, said mid-portion being secured between the end 2 of the U-shaped bar or bracket 1 and one end of the bar 4. The second loop 7 which is straight has securing and guiding members 8 and 9 which hold it connected to the bar 4, along which it is slidable.

The angle at the rear of the frame is to enable the rear end to extend between the cow's legs without the front ends of the loop 6 pressing against the cow's legs and interfering with the placement of the teat cups so as to be applied to the cow's teats. The cups can be adjusted inwardly or outwardly according to the space between the teats. Similarly, the teat cups in the loop 7 may be adjusted laterally, according to the space between the cow's front teats, and may be adjusted forwardly and rearwardly to make the cups line up with the teats.

In use, the operator first inserts the teat cups in the loops 6 and 7, as by springing the wires of the loops over the upper flanges of the teat cups. The latter may then be adjusted along the loops to the desired positions, depending upon the spacing between the cow's teats. The operator then brings the teat cup holder into position underneath the cow's udder. In doing this, the operator may hold either the bar 4 or the bottom of the U-shaped bar 1 but, preferably, he will grasp the bottom of the U with one hand. Then, with his other hand, the operator raises the cups, one at a time, so that the teats, shown in Fig. 1, will be surrounded by the cups and will be held in place by the suction of the milking machine. Normally, the teat cup carrier is left on the teat cups and remains as a part of the teat cup assembly. The carrier, which is light in weight, may rest on the tubes that are connected to the teat cups, or, if desired, the wire loops may frictionally engage the casings of the teat cups below the flanges.

It is of course understood that the specific description of structure set forth above may be departed from without departing from the spirit of this invention as disclosed herein and as defined by the appended claims.

Having now described my invention, I claim:

1. Placement means for the teat cups of a milking machine comprising a wide U-shaped bracket, a bar connecting the arms of the U and spanning the opening thereof, a loop for the reception of a pair of teat cups, said loop being bent centrally to form two sections arranged at an obtuse angle to each other, said loop being secured at its bent portion to the bar and one arm of the U, and a second loop for guiding a pair of teat cups, movably connected at its mid-portion with the bar and slidable longitudinally thereof, each of said loops forming elongated slots for receiving said teat cups and accommodating their adjustment longitudinally of the loops whereby to make possible the placement of the teat cups in accordance with the placement of the cow's teats.

2. Means for assisting in the application of the teat cups of a milking machine to the teats of a cow's udder, said means comprising a pair of loops to receive and hold the teat cups of the machine, one of the loops being substantially centrally bent into an obtuse angle, and a broadly U-shaped frame having a bar across the opening of the frame and attached to the ends thereof, the bent loop being secured to one end of the frame, the second loop being secured to the bar in slidable relation, said loops forming elongated slots for receiving the teat cups in slidable relation, whereby to provide for adjustment of the cups in accordance with the positioning of the cow's teats.

3. A teat cup holder for the teat cups of a milking machine comprising a straight bar, a double ended wire loop having guides secured thereto for mounting the loop on the bar and enabling it to slide longitudinally thereof, a second loop bent in its mid-portion into a substantially obtuse angle, said loop being secured to one end portion of the bar, and a bar of broadly U-shape secured to the ends of the straight bar, with the straight bar closing the openings of the U-shaped bar.

CHARLES B. FINN.

REFERENCES CITED

The following references are of record in the file of this patent:

UNITED STATES PATENTS

| Number | Name | Date |
| --- | --- | --- |
| 331,513 | Martin | Dec. 1, 1885 |
| 2,409,684 | Jenkins | Oct. 22, 1946 |

FOREIGN PATENTS

| Number | Country | Date |
| --- | --- | --- |
| 17,329 | Norway | Feb. 3, 1908 |
| 36,341 | Sweden | Mar. 11, 1914 |
| 50,662 | Sweden | Jan. 11, 1922 |